United States Patent [19]

Pfeifler, II

[11] 4,440,423

[45] Apr. 3, 1984

[54] CONTROL CONNECTOR

[75] Inventor: John R. Pfeifler, II, Oxnard, Calif.

[73] Assignee: Vetco Offshore, Inc., Ventura, Calif.

[21] Appl. No.: 382,510

[22] Filed: May 27, 1982

[51] Int. Cl.³ .................. B61G 5/08; F16L 35/00; F16L 55/00

[52] U.S. Cl. .................. 285/25; 277/29; 277/177; 277/189; 277/206 R; 285/379

[58] Field of Search .............. 285/14, 24, 25, 28, 285/379, 380; 277/29, 177, 189, 206

[56] References Cited

U.S. PATENT DOCUMENTS

| | | | |
|---|---|---|---|
| 3,325,190 | 6/1967 | Eckert et al. | 285/379 X |
| 3,342,500 | 9/1967 | Knudson | 277/124 |
| 3,688,840 | 9/1972 | Curington et al. | 285/25 X |
| 3,701,549 | 10/1972 | Koomey | 285/DIG. 18 |
| 3,831,951 | 8/1974 | Patel et al. | 285/379 X |
| 3,990,730 | 11/1976 | Eckman | 285/379 X |
| 3,999,785 | 12/1976 | Blakeley | 285/379 X |
| 4,328,826 | 5/1982 | Baugh | 285/25 X |
| 4,355,827 | 10/1982 | Ehret | 285/14 X |
| 4,378,123 | 3/1983 | Largent | 285/24 |

FOREIGN PATENT DOCUMENTS 572529 5/1956 Italy ........................ 285/14

Primary Examiner—Wayne L. Shedd
Attorney, Agent, or Firm—Troxell K. Snyder; Edward L. Kochey

[57] ABSTRACT

A two member control connector for joining multiple hydraulic control conduits (20) has one member (14) attached to the underwater equipment. The other member (10) is raisable to the water surface and also carries annular seal assemblies (24) around the mating ends of the conduits (20). The seal assemblies are each retained in a dove-tail groove (26). A vent passageway (42) is also provided in either the seal or the member (10) to prevent the occurance of differential pressure under the assembly, possibly resulting in seal loss.

6 Claims, 6 Drawing Figures

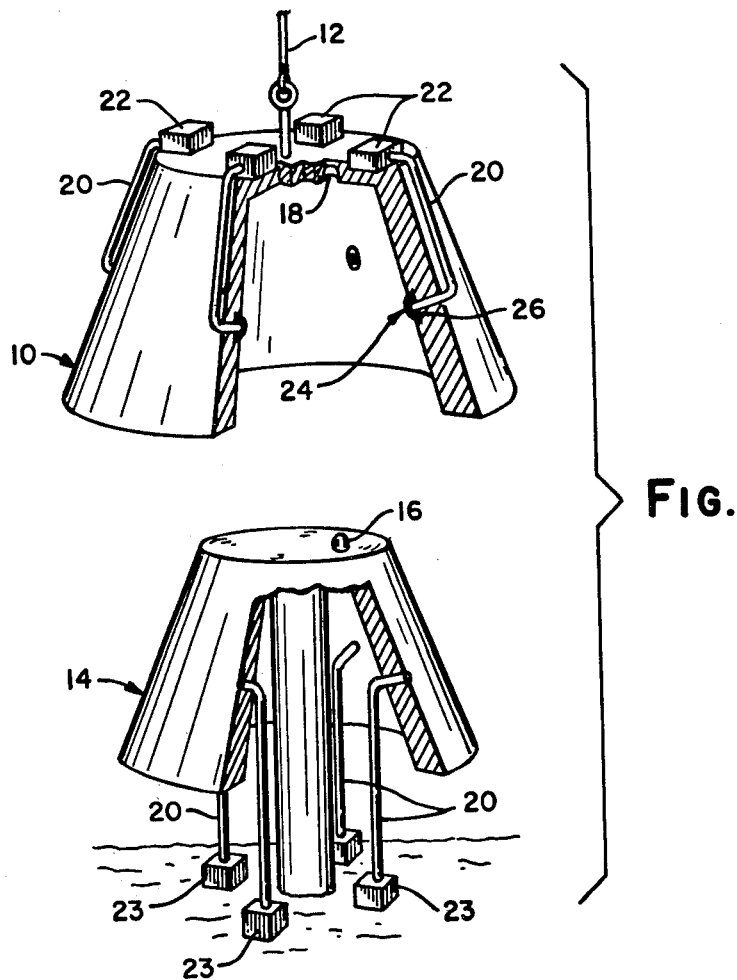
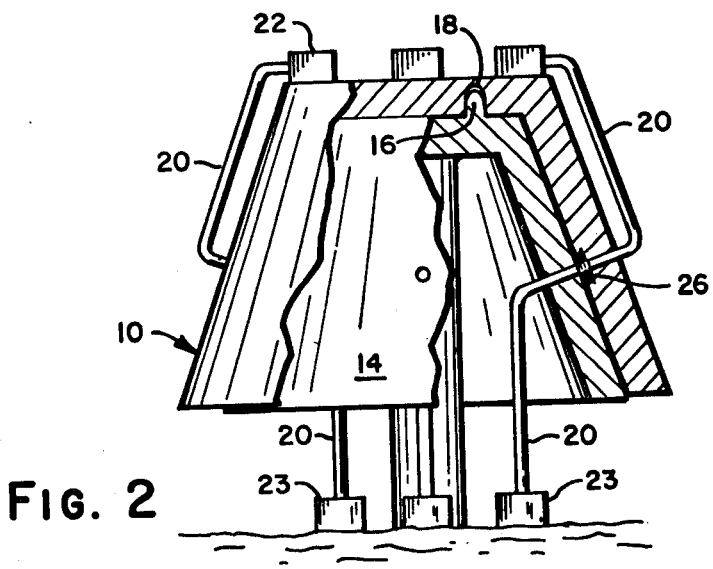

CONTROL CONNECTOR

BACKGROUND OF THE INVENTION

1. Field of the Invention

This invention relates to an underwater control connector and in particular to a connector having a seal for forming a fluid tight junction between two conduits. More particularly, this junction would be formed during the engagement of the two members of the underwater connector, with the joined conduits used for the transmission of hydraulic fluid.

2. General Background

Many underwater operations, in particular oil exploration and production, are performed with a portion of the equipment located at least semi-permanently on the ocean floor. Typically this equipment would be of the type which requires little or no continuing maintenance, is relatively difficult to connect and disconnect from the underwater wellhead connection, and can withstand the rigors of an underwater environment for an extended period of time.

The function of this equipment is directed from the surface of the ocean by means of control conductors traveling from a surface location to the underwater equipment. When used during the drilling phase, emergency situations may arise where it is necessary to immediately disconnect and later reconnect the control conductors. For this purpose connectors have been developed which facilitate this disconnecting and reconnecting of the control conductors to the underwater equipment. As it has been generally found advantageous to employ hydraulically actuated underwater equipment, the connectors employed in this service must acheive a seal between the conduits carrying the hydraulic control signals to the detachable portion of the connector and the conduits running from the underwater portion of the connector to the underwater equipment to be actuated.

During an emergency disconnection, there may not be enough time to reduce the fluid pressure within the conduit. Such a disconnection, when the conduit is under pressure, can lead to loss or dislocation of the sealing element. Subsequent to such an event, the detachable portion of the connector must generally be raised to the surface for replacement of the lost seals.

3. Description of the Prior Art

The seals used in joining the hydraulic conduits between the connector members are an important element of the connector design. A failed seal may result in the inoperability of the corresponding actuator in the underwater equipment and necessitate the repair of the seal before continuing with the underwater operation. If the seal is located in the retrievable portion of the connector it can be raised to the surface for repair, however in deep sea operations, this raising and subsequent lowering of the connector is an expensive and time consuming operation.

One type of seal used in this service is a simple O-ring which would be carried in a concentric groove around the mating end of the hydraulic conduit. When the connector is engaged, the O-ring would be compressed between the connector members and form a fluid tight seal between the corresponding conduits. These simple O-rings were susceptible to blowing out during the engagement and disengagement of the connector as a result of differential pressure between the conduit and the underwater environment.

Another type of sealing means is disclosed in U.S. Pat. No. 3,701,549 by Koomey et al., which shows a cylindrically shaped resilient seal held in a recess in the connector member by a removable retainer which screws into the connector member. Blowout of this seal is prevented by the retainer which compresses the resilient seal into the recess and also cooperates with a metal ring to preclude blowout. This arrangement without the metal ring allows the seal to expand and be dislodged under high pressure release. Replacement of this seal requires that the retainer be unscrewed, the seal member replaced, and the retainer again screwed into the connector.

SUMMARY OF THE INVENTION

The present invention provides an underwater connector including a means for sealing hydraulic control conduits between the two members of the connector.

The seal assembly consists of two parts, an outer packing made of a resilient material that contacts the two engaged connector members, and an inner spring ring which is disposed in a channel formed in the inner surface of the packing. The spring ring is also made of a resilient material and acts to resist the axial compression of the sealing lips on either side of the channel when the connector members are engaged, thereby pre-energizing the seal. The surface of the packing is configured to fit closely with a portion of an annular groove formed in one of the connector members, and is retained thereby.

Also included is a vent which acts to relieve unintentional pressure buildup which may occur beneath the seal packing. This pressure buildup cold act to displace the seal assembly from the retaining groove during a disengagement under pressure.

These and other features and advantages of the present invention will be apparent to one skilled in the art from an examination of the following description of the presently preferred embodiments taken in conjunction with the accompanying drawings.

BRIEF DESCRIPTION OF THE DRAWINGS

FIG. 1 is an elevation view of the connector, in section, showing the connector in a non-engaged position.

FIG. 2 is an elevation view of the engaged connector.

DESCRIPTION OF THE PREFERRED EMBODIMENT

Figure 3:
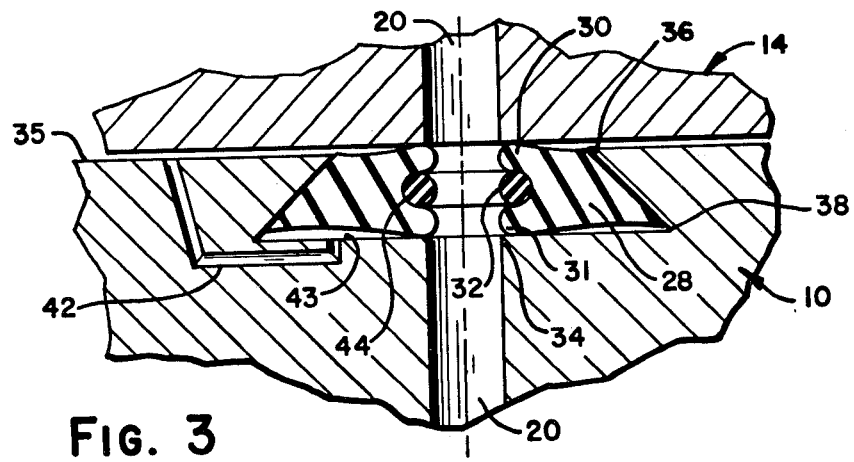
FIG. 3 is a detailed cross-sectional view of the preferred embodiment according to the present invention.
Figure 4:
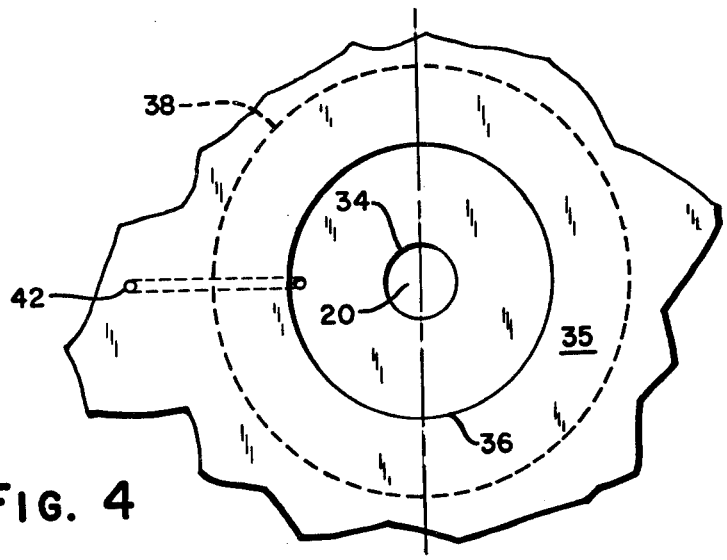
FIG. 4 is a plan view of the retaining groove of the preferred embodiment according to the present invention.

Referring now to FIG. 1 of the drawings, the cap member 10 of the underwater connector is shown suspended by a lifting cable 12 above the head member 14 of the connector. The head member is attached to the underwater equipment to be actuated from the surface vessel. Alignment of the head and cap members is insured by an alignment means, such as a lug 16 and recess 18. Conduits 20 for carrying hydraulic fluid between the hydraulic controllers 22 located on the cap member of the connector or on the surface and the underwater equipment to be actuated 23 are also shown. The appropriate conduits will mate upon engagement of the connector and be sealed by the seal assembly 24 located at the mating end of the cap member conduit. This seal assembly is retained in an annular groove 26 formed in the body of the cap member.

FIG. 2 shows the engaged connector wherein the lug 16 and recess 18 hve been properly engaged and the corresponding conduits have mated in a sealing fashion. Control and actuation of the underwater equipment may now proceed by means of the hydraulic communication thus established through the mated conduits 20 in the engaged connector.

FIG. 3 shows a detailed cross-sectional view of the mated conduits 20 and the seal assembly of the present invention. The annular retaining groove is shown as a dove-tail recess machined in the body in one of the connector members. The seal packing 28 is configured to fit into the dove-tail recess and has a channel 44 which holds the spring ring 32 in position. During the engagement process the two connector members are urged against each other resulting in compression of the sealing lips 30,31 between the bodies of the two members and the spring ring 32 thereby forming an annular, fluid tight seal between the two conduits.

When the hydraulic fluid inside the mated conduits is under a pressure in excess of that of the underwater environment, the fluid pressure will act on the seal assembly to further urge the sealing lips 30,31 each against its respective member, thus increasing the integrity of the fluid tight seal.

The retaining groove is shown in the connector member as having a diameter increasing with the depth beneath the surface 35 of the connector member. The connector member thus forms an inner shoulder 34 of substantially the same radius as the conduit, an outer shoulder 36 at the surface 35 of the connector with a larger radius, and an inner recess 38 of still larger radius. The radii of the recess and outer shoulder are selected to retain the seal assembly in place but to still permit the assembly to be removed and replaced easily. The exact dimensions will depend on the deformability of the seal assembly, the size of the conduits to be mated, and the flow requirements of the conduit.

The surface of the retaining groove between the inner shoulder 34 and the outer recess 38 is preferably flat to facilitate manufacture. The seal assembly, when placed in the retaining groove, will thus be flat and not require any particular rotational orientation. This configuration will result in uneven compression of the seal assembly when the cap member surface 35 has a curved shape as shown in FIG. 1, but experience with the preferred embodiment has shown that this uneven compression does not affect the performance of the invention, while the resulting ease of manufacture and replacement is of significant benefit.

Blowout of seals in underwater connector applications occurs when hydraulic pressure is present behind the seal in such a manner as to urge it out of its proper position. The present invention avoids occurance of this condition by hydraulically sealing the conduit at the equal diameter sealing lips 30,31 indicated in FIG. 3. The hydraulic pressure present around the remainder of the seal packing perimeter remains at the ambient underwater hydraulic pressure, resulting in a balanced pressure distribution over the seal assembly in the axial direction.

The higher internal conduit pressure also exerts a radial force on the seal assembly which acts to hold the seal assembly more firmly in the inner recess, contributing to the resistance of the seal against blowout.

Also shown in FIG. 3 is a passageway 42 in the connector member for venting the volume 43 underneath the packing to the environment. This feature would be useful should a pressure leak develop between the lower sealing lip 31 and the inner shoulder 34. If an inadvertant seal should then occur between the packing and the outer shoulder, higher internal conduit pressure, unless vented, may displace the seal assembly from the retaining groove during disengagement of the connector members. The use of this vent passageway 42 prevents the buildup of pressure under the packing, thus avoiding seal blowout. The vent passageway may also be formed wholly within the seal assembly as shown in FIG. 5, or between the seal assembly and the connector member.

Figure 5:
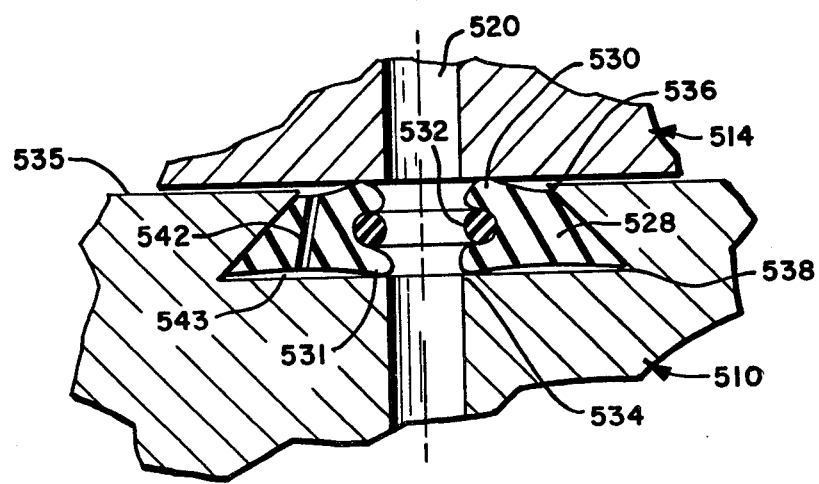
FIG. 5 shows an alternative embodiment according to the present invention.

FIG. 5 also shows an embodiment of the invention wherein the outer sealing lip 30 is of a greater diameter than the inner sealing lip 31. The resulting pressure distribution causes a force imbalance on the seal assembly in the axial direction which acts to hold the seal assembly more firmly into the recess. The bottom of the channel 44 has a diameter at least as great as the diameter of the outer sealing lip in order to assure proper compression of the sealing lips when the connector is engaged.

The members of the invention in FIG. 5 are indicated by the 500 series of numerals with the last two digits corresponding to the equivalent members shown in FIGS. 1,2,3, and 4.

The seal assembly of the present invention may be easily replaced. It can be removed from the retaining groove by use of a slender instrument inserted into the dove-tail groove behind the seal assembly so as to deform the assembly in an appropriate manner. Since this instrument will not be employed near the sealing lips or the surfaces of the connector members which contact the sealing lips, the possibility of damaging these surfaces during the replacement operation is reduced, thereby avoiding the need for expensive and time consuming resurfacing of the damaged connector member surfaces. Insertion of the replacement seal assembly is accomplished by deforming the assembly so that it may be placed into the retaining groove.

This feature represents a significant advance over the prior art which requires the use of a separate retaining member that must be released from the connector member before undertaking replacement of the resilient seal. See, for example, U.S. Pat. No. 3,701,549 by Koomey et al. which also teaches the use of a reinforcing means in conjunction with the resilient seal in order to prevent deformation of the seal during disengagement of the connector under pressure and to thus avoid seal blowout. The present invention does not employ a removable retaining member to hold the resilient seal in place and does not require a reinforcing means to resist blowout during disengagement.

It can readily be seen that the seal assemblies and retaining grooves may be disposed in either the cap or head connector member, however, since the replacement of the seal assemblies can be most easily accomplished on the surface of the water, it is preferable to locate the seals in the connector member ordinarily raised. In the perferred embodiment, the cap member is the raised member and therefore is shown as carrying the seal assemblies.

Based on this detailed description of the preferred embodiments it can be seen that the present invention is well adapted to establish a fluid tight seal between corresponding conduits in an underwater connector. The present invention also has additional advantages of being easy to replace and resistant to blowout during disengagement. The invention is therefore seen to reduce the amount of time and money spent in maintaining underwater connectors and to reduce the complexity of seal replacement in these connectors.

I claim:

1. An underwater hydraulic control connector, comprising:
   a cap member;
   a head member, the cap and head members being engagable each with the other;
   a means for aligning the cap and head members during engagement;
   a plurality of conduits in the cap and head members, each cap member conduit mating with a corresponding head member conduit for fluid communication when the cap and head members are engaged;
   a seal assembly located around the mating end of each of the cap conduits for forming a fluid tight seal between the mated conduits;
   the cap member further having an annular groove disposed about the mating end of the cap conduit, the groove having an increasing diameter at an increasing depth beneath the mating surface of the cap member;
   the seal assembly further comprising,
   a resilient packing member configured to fit closely into at least the portion of the annular groove of increasing diameter for retention thereby, and comprising an inner sealing lip for forming an annular seal around the mating end of the cap member conduit, said inner lip having a first diameter, and an outer sealing lip for forming an annular seal around the mating end of the head member conduit when the cap and head members are engaged, said outer lip having a second diameter at least as great as said first diameter, the packing member further having an annular channel between the inner and outer sealing lips, the bottom of the channel having a diameter at least as great as said second diameter, and
   a resilient ring of a substantially circular cross-section, disposed in the channel and retained therein, for axially urging said inner sealing lip against the cap member and said outer sealing lip against the head member, when the members are engaged.

2. The control connector of claim 1, wherein the seal packing and cap member define a volume beneath the packing and the seal assembly further defines a vent passageway for fluid communication between the volume and the underwater environment.

3. The control connector of claim 1, wherein the seal packing and cap member define a volume beneath the packing and the cap member further defines a vent passageway for fluid communication between the volume and the underwater environment.

4. The control connector of claim 1, wherein the diameter of the annular groove in the cap member increases uniformly with increasing depth beneath the surface of the cap member, whereby a dove-tail shaped groove is achieved.

5. The control connector of claim 4, wherein the seal packing and cap member define a volume beneath the packing and the seal assembly further defines a vent passageway for fluid communication between the volume and the underwater environment.

6. The control connector of claim 4, wherein the seal packing and cap member define a volume beneath the packing and the cap member further defines a vent passageway for fluid communication between the volume and the underwater environment.

* * * * *